(12) United States Patent
Setlur et al.

(10) Patent No.: US 9,813,531 B2
(45) Date of Patent: Nov. 7, 2017

(54) SYSTEM AND METHOD FOR SCREEN ORIENTATION IN A RICH MEDIA ENVIRONMENT

(75) Inventors: Vidya Setlur, Cupertino, CA (US); Suresh Chitturi, Plano, TX (US)

(73) Assignee: SISVEL INTERNATIONAL S.A., Luxembourg (LU)

( * ) Notice: Subject to any disclaimer, the term of this patent is extended or adjusted under 35 U.S.C. 154(b) by 1474 days.

(21) Appl. No.: 12/018,119

(22) Filed: Jan. 22, 2008

(65) Prior Publication Data
US 2008/0209442 A1 Aug. 28, 2008

Related U.S. Application Data

(60) Provisional application No. 60/886,094, filed on Jan. 22, 2007.

(51) Int. Cl.
*G06F 13/00* (2006.01)
*H04M 1/02* (2006.01)
*G06F 9/54* (2006.01)

(52) U.S. Cl.
CPC .......... *H04M 1/0222* (2013.01); *G06F 9/542* (2013.01); *G06T 2200/04* (2013.01)

(58) Field of Classification Search
None
See application file for complete search history.

(56) References Cited

U.S. PATENT DOCUMENTS 6,348,928 B1 * 2/2002 Jeong ............................ 345/649
7,113,194 B2 * 9/2006 Mamona ................. G06T 15/04
345/582
7,746,343 B1 * 6/2010 Charaniya et al. ........... 345/428
7,844,301 B2 * 11/2010 Lee et al. ....................... 455/566
7,941,271 B2 * 5/2011 Ofek ........................ G01C 21/00
340/995.1
8,036,347 B1 * 10/2011 Kanade ....................... 379/88.18
2002/0021278 A1 * 2/2002 Hinckley ............... G06F 1/1626
345/156
2002/0078158 A1 * 6/2002 Brown et al. ................. 709/206
(Continued)

FOREIGN PATENT DOCUMENTS

EP          1124175 A2       8/2001
FR   WO 2007115983 A1 *    10/2007  ........... H04N 1/3877
WO   WO 2005/039157       *  4/2005

OTHER PUBLICATIONS

W3C, "Scalable Vector Graphics (SVG) 1.0 Specificaiton", Sep. 2001, pp. 1-617.*

(Continued)

*Primary Examiner* — H S Sough
*Assistant Examiner* — Phoung N Hoang
(74) *Attorney, Agent, or Firm* — Ditthavong & Steiner, P.C.

(57) ABSTRACT

A method of displaying content on a device comprises detecting a screen orientation change event, determining if one or more applications are configured to accommodate a screen orientation change, and triggering a screen orientation adjustment in a rich media engine. The screen orientation change event may be a hardware change associated with the device. The hardware change may be detected via sensors in the device. The screen orientation change event may be an input by the user or a signal received from a remote device.

23 Claims, 4 Drawing Sheets

(56) References Cited

U.S. PATENT DOCUMENTS

| | | | |
|---|---|---|---|
| 2002/0091615 A1* | 7/2002 | Salvani | 705/37 |
| 2003/0203747 A1* | 10/2003 | Nagamine | 455/566 |
| 2003/0236836 A1* | 12/2003 | Borthwick | 709/204 |
| 2004/0103373 A1* | 5/2004 | Wei | G06F 17/2247 |
| | | | 715/234 |
| 2004/0257337 A1* | 12/2004 | Shibamiya et al. | 345/156 |
| 2006/0046848 A1* | 3/2006 | Abe et al. | 463/37 |
| 2006/0101162 A1* | 5/2006 | Ivarsy et al. | 710/8 |
| 2006/0238384 A1* | 10/2006 | Hess et al. | 340/995.14 |
| 2007/0004451 A1* | 1/2007 | C. Anderson | 455/556.1 |
| 2007/0044028 A1* | 2/2007 | Dunn et al. | 715/761 |
| 2007/0111750 A1* | 5/2007 | Stohr | H04M 1/23 |
| | | | 455/550.1 |
| 2007/0232336 A1* | 10/2007 | Kim | G06F 1/1626 |
| | | | 455/466 |
| 2007/0265031 A1* | 11/2007 | Koizumi et al. | 455/556.1 |
| 2008/0146339 A1* | 6/2008 | Olsen | A63F 13/12 |
| | | | 463/42 |
| 2009/0055415 A1* | 2/2009 | Golds et al. | 707/100 |
| 2009/0137272 A1* | 5/2009 | Okuda et al. | 455/556.1 |
| 2009/0305743 A1* | 12/2009 | Gouesbet | H04N 1/3877 |
| | | | 455/566 |

OTHER PUBLICATIONS

Wick, "Changing Screen Orientation Programmatically", Oct. 2004, pp. 1-7.*

3GPP TSG-SA4#41, Tdoc S4-060640, Screen orientation management in DIMS, Nov. 6-10, 2006.

Notification of Transmittal of the International Search Report and the Written Opinion of the International Searching Authority, or The Declaration; International Search Report for corresponding International Application No. PCT/IB2008/050225, dated Jun. 12, 2008, 5 pages.

* cited by examiner

SYSTEM AND METHOD FOR SCREEN ORIENTATION IN A RICH MEDIA ENVIRONMENT

CROSS-REFERENCE TO RELATED PATENT APPLICATIONS

This application claims priority under 35 U.S.C. §119(e) from U.S. Provisional Application Ser. No. 60/886,094, filed Jan. 22, 2007, incorporated herein by reference in its entirety.

BACKGROUND OF THE INVENTION

The present invention relates generally to the field of wireless devices and, more particularly, presentation and display of content on such devices.

Until recently, applications for mobile devices were text based with limited interactivity. However, as more wireless devices are equipped with color displays and more advanced graphics-rendering libraries, consumers will demand a rich media experience from all their wireless applications. Rich media content generally includes content that is graphically rich and contains compound (or multiple) media including graphics, text, video and audio and, preferably, delivered through a single interface. Rich media dynamically changes over time and could respond to user interaction. Rich media applications, particularly in the Web services domain, include XML-based content such as Scalable Vector Graphics (SVG), Synchronized Multimedia Integration Language (SMIL) and Compound Documents Format (CDF).

SVG (more specifically, version SVGT 1.2) is a language for describing two-dimensional graphics in XML. SVG allows for three types of graphic objects: vector graphic shapes (e.g., paths consisting of straight lines and curves), multimedia (e.g., raster images, video), and text. SVG drawings can be interactive (e.g., using a Document Object Model, or DOM, event model) and dynamic. Animations can be defined and triggered either declaratively (e.g., by embedding SVG animation elements in SVG content) or via scripting. Sophisticated applications of SVG are possible by use of a supplemental scripting language which accesses the SVG Micro Document Object Model (uDOM), which provides complete access to all elements, attributes and properties. A rich set of event handlers can be assigned to any SVG graphical object. Because of its compatibility and leveraging of other Web standards (such as CDF, described below), features like scripting can be done on XHTML and SVG elements simultaneously within the same Web page.

SMIL (specifically, SMIL 2.0) enables simple authoring of interactive audiovisual presentations. SMIL is typically used for rich media/multimedia presentations which integrate streaming audio and video with images, text or any other media type.

The CDF working group is producing recommendations on combining separate component languages (e.g., XML-based languages, elements and attributes from separate vocabularies), like XHTML, SVG, MathML, and SMIL, with a focus on user interface markups. When combining user interface markups, specific problems have to be resolved that are not addressed by the individual markups specifications, such as the propagation of events across markups, the combination of rendering or the user interaction model with a combined document. The CDF working group will address these types of problems.

In order to maximize the user experience while viewing rich media content, efficient delivery of such content of the client is important. However, optimal content presentation is also vital and is more challenging when viewing orientations have to be changed, either explicitly (e.g., declared in the content itself) or implicitly (e.g., via a change in the actual phone screen mode).

A growing number of mobile devices (e.g., Nokia N93, N95) have greater versatility in their form factors, particularly screen orientation and input modalities. While the presentation of rich media content on a client device is scalable and interactive, challenges still exist in presentation when conforming to changes in screen orientation. There is hence a need for the content or the layout of the content displayed on the screen to adapt to these orientation modes for delivering a good user experience.

Typically, built-in advanced sensors in the phone such as an accelerometer, detect when the phone's screen is rotated and, in turn, generate events that notify the top-layer application framework. This notification enables the application to respond to the orientation events to perform certain actions such as changing the appearance of the application (e.g., the application grid on the phone screen) or the content within the application by dispatching this event to the engine that is responsible for rendering or displaying the content. As an alternative, these orientation events may be explicitly streamed from a remote terminal to the client and executed with or without event triggers. However, in order for the underlying engine (for e.g. rich media engine) to understand these application events, it is required to provide mechanisms for enabling proper response to screen orientation events including:

- a syntactic definition of the screen orientation modes in the rich media content;
- a functional and syntactic definition of a rich media based event interface specific to these screen orientation modes; and
- a methodology on how phone hardware based screen orientation events map to the application based event interface, the subsequent processing of these events and actual content realization by the rich media client engine.

Although the concept of different screen orientations has been prevalent for various types of user interface (UI) systems and devices, currently there is no systematic mechanism that defines the handling of screen orientation modes in the context of a rich media environment.

A preliminary contribution was submitted at a Third Generation Partnership Project (3GPP) SA4#41 meeting (ref: ftp://ftp.3gpp.org/TSG_SA/WG4_CODEC/TSGS4_41/Docs/S4-060640.zip) to address this problem. The proposal introduced four events based on angles:

| Event Identifier | Namespace | Description |
| --- | --- | --- |
| "screenOrientation0" | urn:mpeg:mpeg4:laser:2005 | The screen orientation has changed to typical 'landscape' orientation |

-continued

| Event Identifier | Namespace | Description |
| --- | --- | --- |
| "screenOrientation90" | urn:mpeg:mpeg4:laser:2005 | The screen orientation has changed to typical 'portrait' orientation |
| "screenOrientation180" | urn:mpeg:mpeg4:laser:2005 | The screen orientation has changed to inverted 'landscape' orientation |
| "screenOrientation270" | urn:mpeg:mpeg4:laser:2005 | The screen orientation has changed to inverted 'portrait' orientation |

However, with this proposal, the event identifiers are based on angles and, therefore, introduce ambiguity while mapping the underlying hardware/OS based events to these content based events. For example, the Symbian UI framework does not support inverted portrait and landscape modes. Further, the proposal does not define the mapping of the event identifiers to an event interface. In addition, the proposal lacks the definition of event interface, which is crucial for obtaining information related to the screen orientation, such as screen width/height, and the location of the soft keys in response to the change in screen orientation.

Further, U.S. Patent Publication No. 2002/0101439, titled "Method and Apparatus for Rotating an Image on a Display," utilizes a three-dimensional rendering engine to rotate an image based on a user-selected or otherwise determined screen orientation. A vertex coordinate transformation is defined for a rotated destination image. The source image is used as a texture for texture mapping during rendering operation to produce rotated image. However, this disclosure mainly concerns image manipulation via rotation and texture mapping to align with the desired screen orientation.

U.S. Pat. No. 6,597,384, titled, "Automatic Reorienting of Screen Orientation Using Touch Sensitive System," discloses the automatic change of display by sensing a change in the direction of the display via touch sensors. This disclosure focuses primarily on the mapping of hardware events triggered by touch sensors to the actual orientation of the screen. It fails to address any application level functionality for handling such orientation and is restricted mainly to touch screens.

U.S. Pat. No. 5,910,797, titled, "Portable Data Processing Apparatus Provided with a Screen and a Gravitation-Controlled Sensor for Screen Orientation," discloses a gravitation-controlled sensor in the screen for measuring a spatial orientation. The disclosed apparatus has a programmed data processor under control of a predetermined range of spatial orientations imparting a non-stationary motion pattern to a predetermined selection among the objects. The motion can be used in the way of a joystick. This disclosure is related to hardware mechanisms for enabling screen orientation, rather than any application-level functionality, as needed for rich media content.

U.S. Pat. No. 5,661,632, titled, "Hand Held Computer with Dual Display Screen Orientation Capability Controlled by Toggle Switches Having First and Second Non-Momentary Positions," discloses an architecture of a handheld computer having a generally rectangular housing on a front side wall of which a display screen is operatively mounted. A row of toggle switches is also mounted on the front housing side wall, adjacent the display screen, the toggle switches being operatively connected to the computer circuitry within the housing. One of the toggle switches is operative, via the internal computer circuitry, to selectively rotate, through an angle of 90 degrees, the orientation of data generated on the screen so that the screen data is in an upright viewing orientation relative to the user of the computer. Because the toggle switches are non-momentary, the orientation of the data generated on the screen is preserved while the handheld computer is turned off. Again, this disclosure concerns hardware rather than application level mechanisms for screen orientation.

SUMMARY OF THE INVENTION

One aspect of the invention relates to a method of displaying content on a device. The method comprises detecting a screen orientation change event and triggering a screen orientation adjustment in a rich media engine.

In one embodiment, the method further comprises determining if one or more applications are configured to accommodate a screen orientation change.

In one embodiment, the screen orientation change event is a hardware change associated with the device. The hardware change may be detected via sensors in the device.

In one embodiment, the screen orientation change event is an input by the user.

In another embodiment, the screen orientation change event is a signal received from a remote device.

In one embodiment, the rich media engine includes a screenOrientation attribute. The screenOrientation attribute may have a value selected from portrait, landscape or angle. The rich media engine may further include a view attribute applicable to a subset of an application to be oriented. The screenOrientation event or attribute may include attributes of screenwidth, screenHeight and screenAngle In one embodiment, the screen orientation adjustment repositions one or more soft keys.

In another aspect of the invention, a computer program product, embodied on a computer-readable medium, for displaying content on a device comprises computer code for detecting a screen orientation change event, and computer code for triggering a screen orientation adjustment in a rich media engine.

In another aspect of the invention, a wireless device comprises a detection module adapted to detect a screen orientation change event and a screen orientation module adapted to trigger a screen orientation adjustment in a rich media engine.

In another aspect of the invention, a rich media interface comprises a ScreenOrientationEvent attribute adapted to change screen orientation of a screen of a device upon a triggering event and one or more screen dimension attributes defining the dimensions of the screen after changing orientation.

DETAILED DESCRIPTION OF THE PREFERRED EMBODIMENTS

Embodiments of the present invention address the need for dynamic and interactive multimedia scenes (DIMS) applications to adapt to changes in screen orientation. Embodiments of the present invention provide mechanisms that are both syntactic and functional to address the screen orientation problem for rich media content. Such mechanisms enable implicit (e.g., when the phone screen is rotated between landscape and portrait) and explicit (e.g., when the content itself includes a screen orientation event listener to a button that is triggered when clicked) adaptation of content to the required orientation modes. In particular, embodiments of the invention provide (1) application based orientation modes for rich media content, (2) an event interface for these orientation modes, and (3) event management and processing of screen orientation events.

There are several use cases where such screen orientation mechanisms described herein would be useful in rich media services. For example, interactive mobile TV services are understood as the ability to provide a deterministic rendering and behavior of rich-media content, including audio-video content, text, images, XML-based content such as SVG, and TV and radio channels, together in the end-user interface. The service must provide convenient navigation through the content in a single application or service and must allow synchronized interaction, such as voting and personalization (e.g., related menu or sub-menu, advertising and content in function of the end-user profile or service subscription). Typically, default applications run in portrait mode on hand-held devices. However, it may be optimal to view mobile TV in landscape mode for various reasons (e.g., displaying closed captioning, video content itself is in landscape mode, etc.).

Further, a live enterprise data feed may include stock tickers that provide streaming of real-time quotes, live intra-day charts with technical indicators, news monitoring, weather alerts, charts, business updates, etc. Given how such data could dynamically vary in terms of what is shown and how much content is shown, the content may often toggle between several orientations.

Further, certain rich media games allow for multimedia content to be presented with some game logic for entertainment purposes. Either based in user interaction or change in game logic, the orientation of the content may change.

Figure 1:
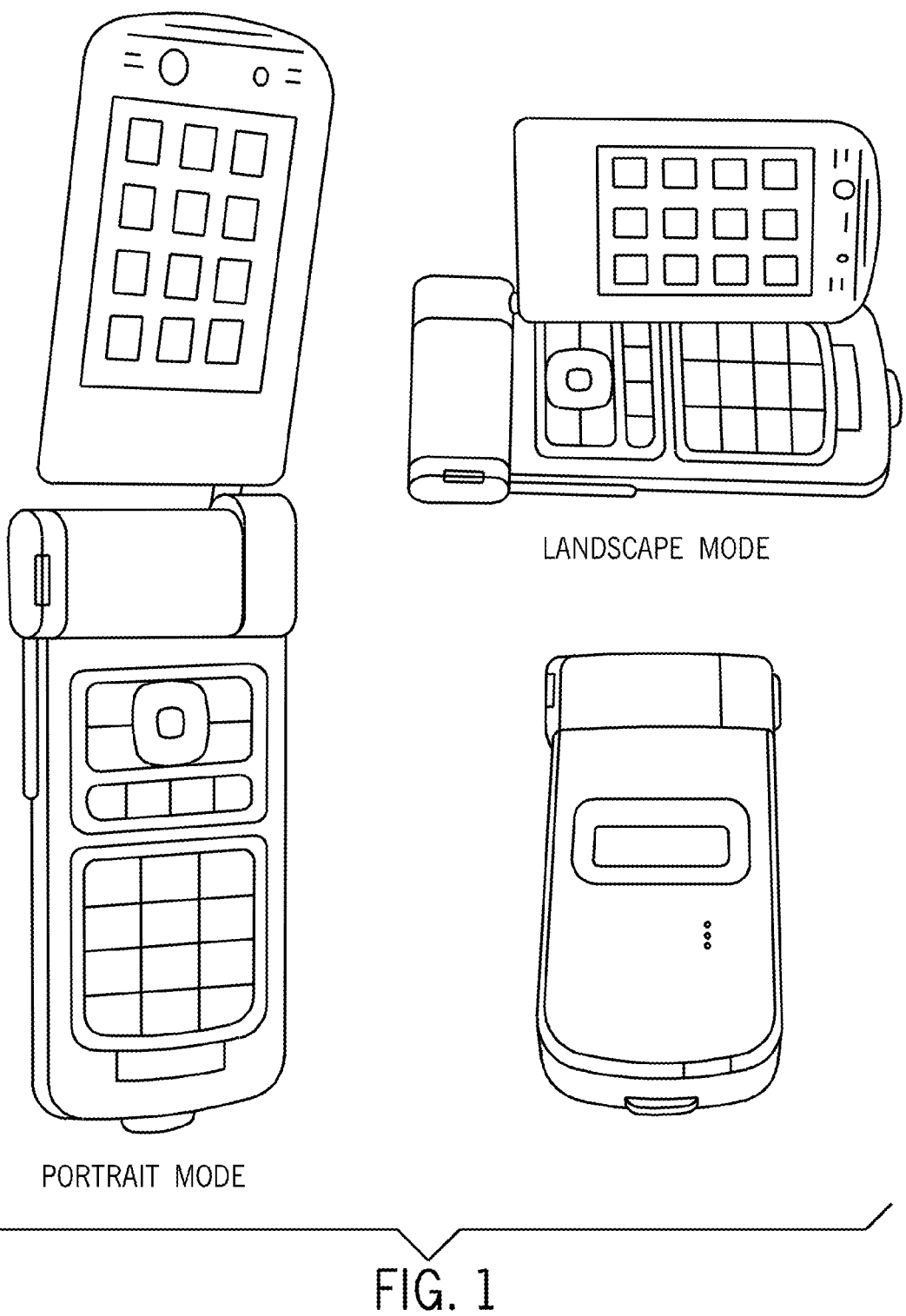
FIG. 1 is a picture illustrating an exemplary wireless device adapted to display content in portrait and landscape formats according to an embodiment of the present invention.

In accordance with embodiments of the present invention, the following may be used for generating screen-orientation events: (1) via device hardware events (e.g., rotation of the phone screen) and (2) explicit instructions, for example, sent from a remote terminal/server that would be triggered when certain events occur on the client. In the first case, the application could completely rely on the underlying application shell to take care of rotating the content based on the orientation of the screen. However, automatic adaptation of the content by simple rotation is not always optimal. Certain adjustments to the content presentation are often preferred for better viewing experience. For example, in FIG. 1, the application grid on the N93 screen is readjusted from portrait to landscape to make efficient use of the screen. These adjustments of how the content is to be adapted have to be specified in the data itself. In addition, the second case of adjusting orientation based on events (e.g., a button click, after a duration of a certain period) would need explicit definition in the data as well. Thus, in accordance with an embodiment of the invention, an attribute called "screenOrientation" in the rich media content is provided. In one embodiment, this attribute takes one of three possible forms: specification of the portrait format, specification of the landscape format, or an angle in degrees. While the first two values correspond to existing modes on most devices, the third option can be user defined.

| Attribute | Value | Namespace | Description |
| --- | --- | --- | --- |
| "screenOrientation" | Portrait | dims:events | Specified when the content needs to be presented in "portrait" mode. |
| | Landscape | dims:events | Specified when the content needs to be presented in "landscape" mode. |
| | Angle of orientation in degrees | dims:events | Specified when the content needs to be presented in an orientation that is inclined to the vertical viewing axis by the specified angle. |

In another embodiment, a "view" element for defining the scope of the screen orientation in rich media content is provided. While the "screenOrientation" attribute specifies the mode in which the rich media content has to be rendered, there still needs to be a way of specifying how much of the content has to be rendered in that mode.

For example:

```
<svg viewBox = "0 0 1000 1000" version = "1.1">
  <circle id = "s1" cx = "300" cy = "300" r = "200" fill = "mediumorchid" stroke = "black" stroke-width = "3"/>
  <ellipse id = "s2" cx = "350" cy = "800" rx = "200" ry = "150" fill="lightskyblue" stroke = "black" stroke-width = "3"/>
  <circle id = "s3" cx = "770" cy =
```

-continued

```
"750" r = "200" fill = "tomato" stroke =
"black" stroke-width = "3"/>
    <ellipse id = "s4" cx = "430" cy =
"600" rx = "200" ry = "150" transform =
"rotate(-45,100,100)" fill =
"mediumseagreen" stroke = "black"
stroke-width = "3"/>
</svg>
```

Here, if the first circle and the first ellipse are to be rendered in landscape mode while the second circle and second ellipse are to be rendered normally in the default presentation mode, one would have to use the "screenOrientation" mode for every element that needs to be rendered in that mode. So in the above example, screenOrientation="landscape" would have to be added to the first circle and first ellipse. While this may still be considered fine with just two elements, it is not optimal to add the same mode for large sets of elements. Thus, to address this issue, we introduce the concept of "views" in this invention.

A "view" is a subset of the rich media content that can be rendered and interacted within the application. By default, an application has at least one logical view. If the entire application is to rendered in a particular orientation, then views are not required. However, if a subset of the application is to be rendered in one mode then views are useful in differentiating the scope of the "screenOrientation" attribute applied.

Again, considering the above example, the svg content with views would be:

```
<svg viewBox = "0 0 1000 1000" version = "1.1">
<view id = "1 " screenOrientation =
"landscape">
    <circle id = "s1" cx = "300" cy = "300" r = "200"
fill = "mediumorchid" stroke = "black" stroke-width =
"3"/>
    <ellipse id = "s2" cx = "350" cy = "800" rx = "200"
ry = "150" fill="lightskyblue" stroke = "black" stroke-
width = "3"/>
</view>
    <circle id = "s3" cx = "770" cy = "750" r = "200"
fill = "tomato" stroke = "black" stroke-width = "3"/>
    <ellipse id = "s4" cx = "430" cy = "600" rx = "200"
ry = "150" transform = "rotate(-45,100,100)" fill =
"mediumseagreen" stroke = "black" stroke-width =
"3"/>
</svg>
```

Further, a particular view can be associated with a screenOrientation event that would be triggered upon a certain condition being satisfied.

In one embodiment of the invention, one or more event types are provided. For example, event types may include "screenOrientationPortrait," "screenOrientationLandscape" and "screenOrientationManual" corresponding to the screenOrientation attribute values "portrait", "landscape" and "orientation in degrees," respectively. The first two events (i.e., portrait and landscape) are the most commonly used orientations in current devices.

In another embodiment, a screen orientation event interface for the rich media system is provided. The following is the definition of the screenOrientation interface that provides the contextual information related to screen orientation changes. This interface is designed and based on DOM Level 3 events specification, and therefore can be used in any DOM based implementations. Note that this interface extends the base "event" interface, which contains the basic event information such as the event target, and event type information.

```
interface ScreenOrientationEvent : Event
{
    const unsigned short SOFTKEYS_LEFT = 1;
    const unsigned short SOFTKEYS_RIGHT= 2;
    const unsigned short SOFTKEYS_TOP = 3;
    const unsigned short SOFTKEYS_BOTTOM= 4;
    readonly attribute long screenWidth;
    readonly attribute long screenHeight;
    readonly attribute unsigned short softKeysLayout;
}
```

Figure 4A:
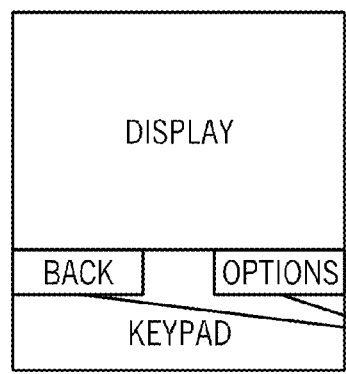
FIGS. 4(a)-(d) illustrate the display of content on a screen in various formats according to an embodiment of the present invention.

"SOFTKEYS_BOTTOM" indicates that the device soft keys at the bottom of the screen in the current screen orientation, as illustrated in FIG. 4a.

Figure 4B:
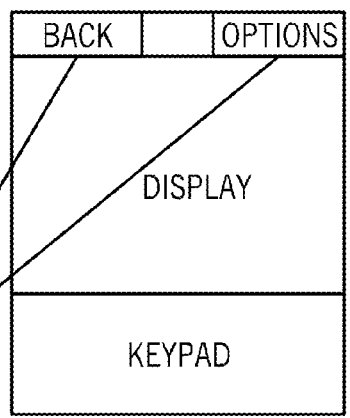

"SOFTKEYS_TOP" indicates that the device soft keys are at the top of the screen in the current screen orientation, as illustrated in FIG. 4b.

Figure 4C:
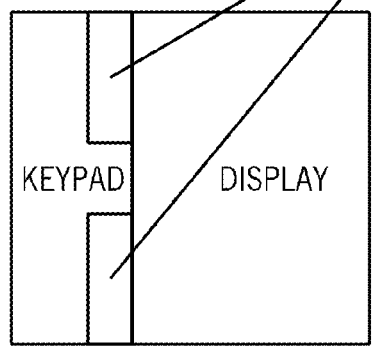

"SOFTKEYS_LEFT" indicates that the device soft keys are to the left of the screen in the current screen orientation, as illustrated in FIG. 4c.

Figure 4D:
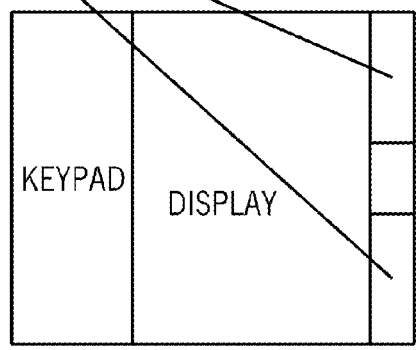

"SOFTKEYS_RIGHT" indicates that the device soft keys are to the right of the screen in the current screen orientation, as illustrated in FIG. 4d.

"ScreenWidth" contains the new screen display or viewport width reflecting the new orientation. "ScreenHeight" contains the new screen display or viewport height reflecting the new orientation. "SoftKeysLayout" indicates the location of the device soft keys in response to the orientation change. The possible values are SOFTKEYS_LEFT, SOFTKEYS_RIGHT, SOFTKEYS_TOP, and SOFTKEYS_BOTTOM, as described above with reference to FIGS. 4(a)-(d).

For reference, provided below is the event interface as defined in DOM Level 3 events specification:

```
interface Event
{
    readonly attribute EventTarget target;
    readonly attribute DOMString type;
    readonly attribute currentTarget;
    . . .
    . . .
    . . .
}
```

With the information provided by the screen orientation interface, the user agent or underlying rich media engine can adapt to the layout or visual representation of the content to current screen orientation.

In another embodiment, the event management and processing of screen orientation events is provided. According to an embodiment of the invention, the event management and processing of screen orientation events is based on the DOM Level 3 events processing model. This includes event creation, event dispatching, event registration and event handling.

Event creation deals with the creation of a ScreenOrientationEvent object which is an implementation of ScreenOrientationEvent interface. This event is directly mapped to the hardware event notification (e.g., using the Symbian UI framework) or through an event "message" from the server. During the event creation it is important that the relevant event attributes such as event target, event type, screenWidth, screenHeight attributes are set.

Event dispatching deals with dispatching the ScreenOrientation event to the appropriate target based on the event target.

With regard to the event registration, the content author or application typically registers for the events if he/she chooses to listen to a particular event. For example, to listen to a ScreenOrientationEvent, a listener must be registered with the event target within the rich media engine. This can be done either declaratively using the <ev:listener> element or can be done by the implementation by attaching the "EventListener" object to the "EventTarget" object. This completes the registration process and is usually done prior to the event creation and dispatching phase.

Event handling relates to event processing or realization. Event handlers contain the logic or code that must be executed based on a specific event listener and an event target. For example, when the ScreenOrientationEvent is dispatched to a particular event target as described in the previous stages, the event manager of the rich media engine checks the list of event listeners and invokes the appropriate event handler, thereby executing the logic that is present within the handler. And the handler can access all the information relevant to screen orientation as defined by the ScreenOrientationEvent object.

Figure 2:
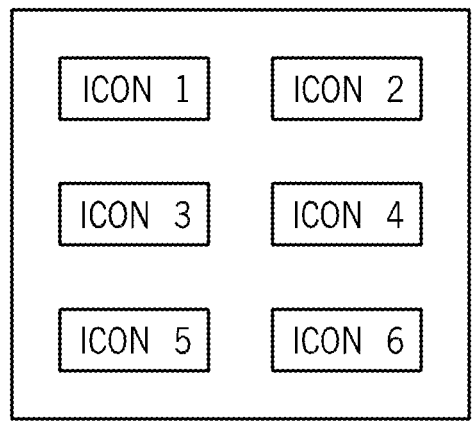
FIG. 2 illustrates the display of content on a screen in a portrait format according to an embodiment of the present invention.
Figure 3:
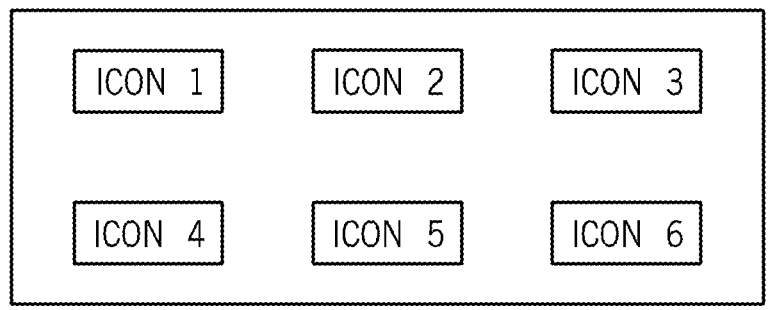
FIG. 3 illustrates the display of content on a screen in a landscape format according to an embodiment of the present invention.

The following example illustrates the concept of screen orientation and the content adoption based on the orientation change. The content is authored in SVG format. When this content is loaded by the rich media client, the content is seen in the portrait mode (default), as illustrated in FIG. 2. Now, when the screen orientation change event is fired, either by the hardware or streamed from the server, this event gets dispatched to the rich media engine, where the <listener> elements get the notification. Upon this notification, the listener elements invoke the appropriate <handler> elements that, in this example, execute the associated scripts to change the layout of the content from 'portrait' mode to 'landscape' mode, as illustrated in FIG. 3.

```
<svg xmlns="http://www.w3.org/2000/svg" version="1.2"
baseProfile="tiny"
   xmlns:ev="http://www.w3.org/2001/xml-events">
   xmlns:mynamespace="http://www.example.com/
         <desc>An example of the screen orientation</desc>
   <rect xml:id="icon1" x="10" y="10" width="20" height="10"
fill="red"/>
   <rect xml:id="icon3" x="10" y="30" width="20" height="10"
fill="green"/>
   <rect xml:id="icon5" x="10" y="50" width="20" height="10"
fill="yellow"/>
   <rect xml:id="icon2" x="40" y="10" width="20" height="10"
fill="blue"/>
   <rect xml:id="icon4" x="40" y="30" width="20" height="10"
fill="purple"/>
   <rect xml:id="icon6" x="40" y="50" width="20" height="10"
fill="orange"/>
   <ev:listener ev:event="mynamespace: screenOrientationLandscape "
observer="icon1" handler="#theOrientationHandler"/>
      <ev:listener ev:event="mynamespace: screenOrientationLandscape "
observer="icon2" handler="#theOrientationHandler"/>
      <ev:listener ev:event="mynamespace: screenOrientationLandscape "
observer="icon3" handler="#theOrientationHandler"/>
      <ev:listener ev:event="mynamespace: screenOrientationLandscape "
observer="icon4" handler="#theOrientationHandler"/>
      <ev:listener ev:event="mynamespace: screenOrientationLandscape "
observer="icon5" handler="#theOrientationHandler"/>
      <ev:listener ev:event="mynamespace: screenOrientationLandscape "
observer="icon6" handler="#theOrientationHandler"/>
   <handler xml:id="theOrientationHandler"
type="application/ecmascript">
         var tarIcon = evt.target;
      if(tar.id == "icon3" && evt.screenWidth > 60 &&
```

-continued

```
evt.screenWidth < 100){
         tarIcon.setFloatTrait("x", 70);
tarIcon.setFloatTrait("y", 10); }
      if(tar.id == "icon4"){
         tarIcon.setFloatTrait("x", 10);
tarIcon.setFloatTrait("y", 30); }
      if(tar.id == "icon5"){
         tarIcon.setFloatTrait("x", 40);
tarIcon.setFloatTrait("y", 30); }
      if(tar.id == "icon6" && evt.screenWidth > 60 &&
evt.screenWidth < 100){
         tarIcon.setFloatTrait("x", 70);
tarIcon.setFloatTrait("y", 30); }
   </handler>
</svg>
```

In one embodiment, hardware-based orientation event triggers are mapped to software-based rich media screen events. While screenOrientation events can be triggered purely from the application software side (e.g., via a button click, menu selection, after a certain time duration, etc.), these events could also be triggered from a change in orientation of the phone screen. In order to address the latter scenario, the mapping from the underlying phone hardware event triggers to the rich media application based screenOrientation events needs to be specified. In order to explain the mapping, we take the example of Symbian, particularly the S60 application framework. Though the S60 application framework is not the only framework used on mobile phones, it is representative of a larger market of such adaptable screen devices.

In Symbian, applications would normally be expected to run in any screen orientation, portrait or landscape. The applications can, however, specify a fixed orientation that they require to work in. By default, applications are set to work in any orientation, so only applications that have a definitive orientation requirement should take any action.

Looking at the API documentation for aknscreenmode.h, one method in this library is:

```
static IMPORT_C void TAknScreenModes::SetAppUiScreenModeL
   ( CAknAppUiBase
   * aAppUi , const TAknScreenMode & aMode) [static]
```

Here, the application will be displayed in the selected screen mode. The application will no longer respond to hardware or software events which would normally affect screen mode. It will be permanently fixed to the selected screen mode. The list of available screen modes are specific to that particular device. If an application wants a fixed orientation, it should use the scalable APIs in CEikAppUi. Particularly, a new enumeration and two APIs have been added to CEikAppUi:
   enum CAknAppUiBase::TAppUiOrientation with possible values;
   EAppUiOrientationUnspecified This is the default rotation setting for an application, and it should be used by nearly all applications.
   EAppUiOrientationPortrait Use a portrait screen rotation for this application.
      This should only be used when an application specifically wants portrait rotation. The device will select an appropriate portrait rotation, if one is available.
   EAppUiOrientationLandscape Use a landscape screen rotation for this application.

This should only be used when an application specifically wants landscape rotation. The device will select an appropriate landscape rotation, if one is available.

EAppUiOrientationAutomatic Use the normal device screen rotation set for this application.

Both portrait and landscape screen rotations are possible. The application rotation follows device screen rotation.

```
// Gets the application screen orientation.
mk:@MSITStore:C:\Symbian\9.2\S60_3rd_FP1_4\S60Doc\S60_
CPP_SDK_3rd_FP1_APIRefGuide.chm::/classCAknAppUiBase.html-
ba93469386810cee1e427ba6c4c55c3a#ba93469386810cee1e427
ba6c4c55c3a
TAppUiOrientation CEikAppUi::Orientation( ) const;
// Sets the application screen orientation.
mk:@MSITStore:C:\Symbian\9.2\S60_3rd_FP1_4\S60Doc\S60_
CPP_SDK_3rd_FP1_APIRefGuide.chm::/classCAknAppUiBase.html-
ba93469386810cee1e427ba6c4c55c3a#ba93469386810cee1e427
ba6c4c55c3a
void CEikAppUi::SetOrientationL(TAppUiOrientation
aOrientation);
```

The above methods can be invoked in AppUI::HandleScreenDeviceChangedL( )

An example is provided below. Here, we are trying to detect a flip-state by checking the current screen mode. Each mode has a different size, and one or more possible rotations/orientations. For the actual mode change detection, you need to implement the method HandleScreenDeviceChangedL( ) on the UI class. A sample header file definition based on the standard HelloWorld example is illustrated below.

```
class CSimpleAppUi : public CQikAppUi
    {
    public:
        void ConstructL ( );
        ~CSimpleAppUi ( );
    private:
        // Inherited from class CEikAppUi
        void HandleCommandL(TInt aCommand);
        void HandleScreenDeviceChangedL( );
        . . .
```

HandleScreenDeviceChangedL( ) will be called by the system when the screen mode changes. To check which mode it is in (Flip open or Flip closed), the following code is inserted in the implementation of HandleScreendeviceChangedL( ):

```
CWsScreenDevice& screenDevice = *(iCoeEnv->ScreenDevice( ));
TBool isFlipOpen = (screenDevice.CurrentScreenMode( ) == 0)
?
    ETrue : EFalse;
```

Finally, it is ensured that the window server notifies your application when the screen mode changes. To do that, the following is added to the ConstructL( ) method:

```
RWindowGroup& rootWinGroup = iCoeEnv->RootWin( );
rootWinGroup.EnableScreenChangeEvents( )
```

This would, in turn, notify the rich media engine, and the corresponding screenOrientation event would be set in the rich media environment for either a specific view in the content or to entire document.

Figure 5:
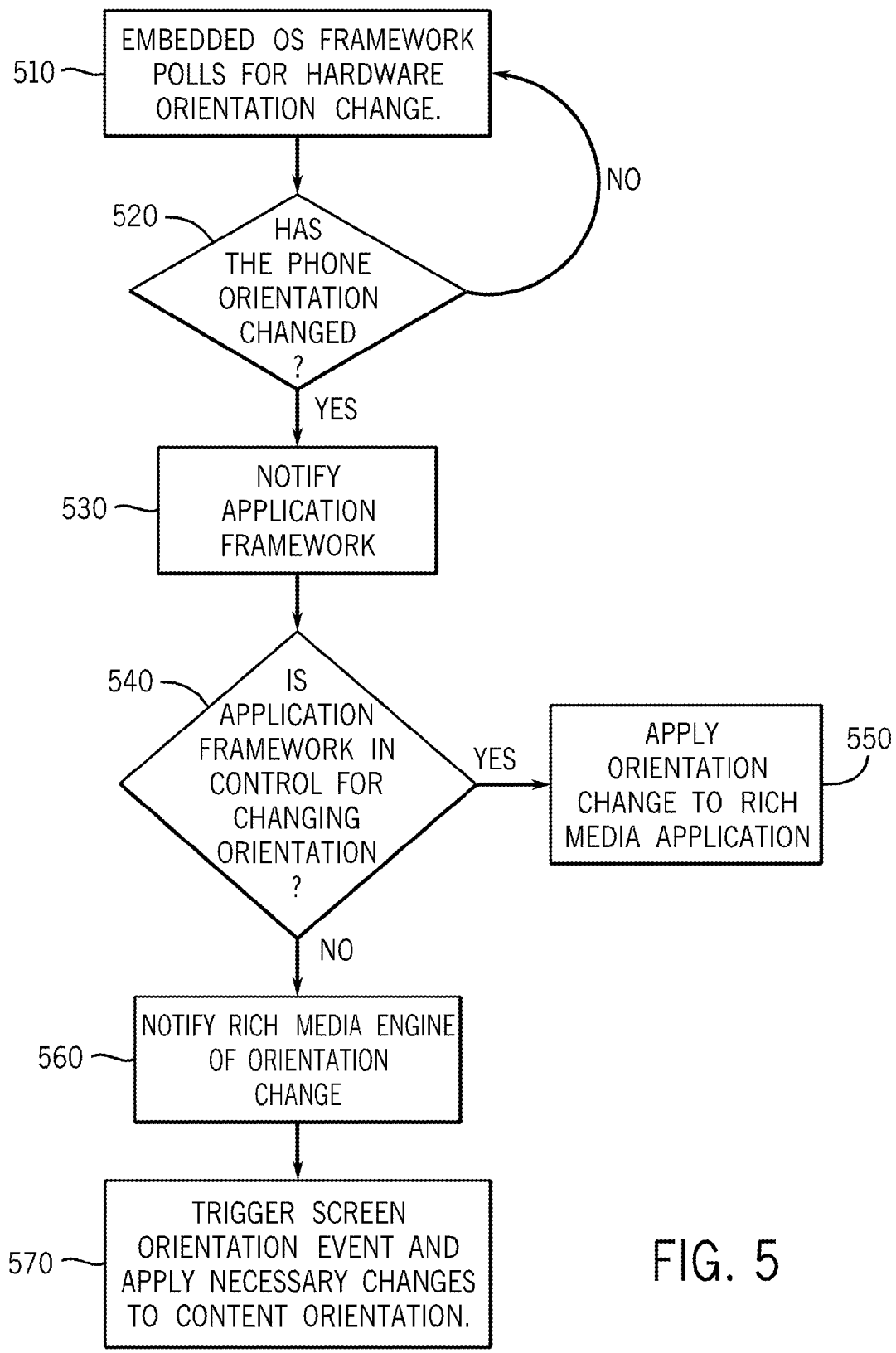
FIG. 5 is a flowchart illustrating a method of displaying content according to an embodiment of the present invention.

The process flow is illustrated in FIG. 5. The embedded OS framework regularly or continuously polls for hardware orientation changes (block 510). At block 520, the OS framework determines whether the phone orientation has changed. As noted above, this may be achieved through use of sensors in the hardware. If no changes are detected, the OS framework continues to poll for hardware changes. On the other hand, if a change is detected, the process proceeds to block 530 and notifies the application framework. At block 540, if the application framework is responsible for changing orientation, the process proceeds to block 550, and the orientation change is applied to the rich media application. If the application framework is not responsible for changing orientation, the process proceeds to block 560, and the rich media engine is notified of the orientation change. At block 570, the screenOrientation event is triggered and the necessary changes are applied to the content orientation.

In other embodiments, the attribute values for screenOrientation can be extended for future orientation modes. Further, the screenOrientation event types can also be extended for future orientation modes. The mapping of device hardware event triggers to rich media screenOrientation events are agnostic of the underlying embedded operating system.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
   detecting, by a processor, a screen orientation change event of a screen,
      wherein the screen orientation change event is associated with triggering an angle of orientation of the screen,
      wherein the triggered angle of orientation has an angle orientation value other than an angle orientation value of a portrait or landscape orientation;
   notifying an application framework of the detected screen orientation change event;
   retrieving an adjustment of the screen orientation from a rich media engine, one or more applications associated with the application framework, or an operating system associated with the application framework based on the detection of the screen orientation change event, said one or more applications being associated with the rich media engine,
      wherein the rich media engine is configured to provide a rendering in a multimedia format of rich-media content in an end-user interface,
      wherein the rich media engine includes a screenOrientation attribute,
      wherein the screenOrientation attribute includes a screenWidth and/or screenHeight defining one or more screen dimension attributes of the screen,
      wherein the screenOrientation attribute includes an attribute value, based on the angle orientation value, specifying the angle of orientation of the screen, other than an angle of portrait or landscape orientation, in rendering the rich-media content in the end-user interface,
   determining if the one or more applications or the operating system are configured to accommodate a screen orientation change,
      if the application framework is in control of changing the angle of orientation of the screen, then applying the angle of orientation of the screen to the rich media engine,
      if the application framework is not in control of changing the angle of orientation of the screen, then notifying the rich media engine of the screen orientation change event,
      wherein the screenOrientation attribute specifies a view mode which determines a subset of the rich-media content rendered in the end-user interface; and
   adapting a layout and/or visual representation of at least part of the rich-media content in the end-user interface based on the adjustment of the screen orientation.

2. The method of claim 1, wherein the rich media engine is further configured to provide navigation through and/or synchronized interaction with the rendering of the rich-media content in the end-user interface,
   wherein the rich media content includes at least one of audio content, video content, text, images, XML-based content and combinations thereof,
   wherein the multimedia format is a dynamic and interactive multimedia scene (DIMS) format.

3. The method of claim 2, wherein the screen orientation change event is a hardware change detected via sensors in the device.

4. The method of claim 1, wherein the screen orientation change event is an input by the user.

5. The method of claim 1, wherein the screen orientation change event is a signal received from a remote device.

6. The method of claim 1,
   wherein the value of the angle of orientation of the screen is user-defined,
   wherein the ScreenOrientation attribute also includes one or more attribute values of a portrait format and/or a landscape format in rendering the rich-media content in the end-user interface.

7. The method of claim 1, wherein the adjustment of the screen orientation repositions one or more soft keys.

8. A non-transitory computer-readable storage medium carrying one or more sequences of one or more instructions which, when executed by one or more processors, cause an apparatus to at least perform the following steps:
   detect a screen orientation change event of a screen,
      wherein the screen orientation change event is associated with triggering an angle of orientation of the screen,
      wherein the triggered angle of orientation has an angle orientation value other than an angle orientation value of a portrait or landscape orientation;
   notify an application framework of the detected screen orientation change event;
   retrieve an adjustment of the screen orientation from a rich media engine, one or more applications associated with the application framework, or an operating system associated with the application framework based on the detection of the screen orientation change event, said one or more applications being associated with the rich media engine,
      wherein the rich media engine is configured to provide a rendering in a multimedia format of rich-media content in an end-user interface,
      wherein the rich media engine includes a screenOrientation attribute,
      wherein the screenOrientation attribute includes a screenWidth and/or screenHeight defining one or more screen dimension attributes of the screen,
      wherein the screenOrientation attribute includes an attribute value, based on the angle orientation value, specifying the angle of orientation of the screen, other than an angle of portrait or landscape orientation, in rendering the rich-media content in the end-user interface,
   determine if the one or more applications or the operating system are configured to accommodate a screen orientation change,
      if the application framework is in control of changing the angle of orientation of the screen, then applying the angle of orientation of the screen to the rich media engine,
      if the application framework is not in control of changing the angle of orientation of the screen, then notifying the rich media engine of the screen orientation change event,
      wherein the screenOrientation attribute specifies a view mode which determines a subset of the rich-media content rendered in the end-user interface,
   adapt a layout and/or visual representation of at least part of the rich-media content in the end-user interface based on the adjustment of the screen orientation.

9. The non-transitory computer-readable storage medium of claim 8, wherein the rich media engine is further configured to provide navigation through and/or synchronized interaction with the rendering of the rich-media content in the end-user interface,
wherein the rich media content includes at least one of audio content, video content, text, images, XML-based content and combinations thereof,
wherein the multimedia format is a dynamic and interactive multimedia scene (DIMS) format.

10. The non-transitory computer-readable storage medium of claim 9, wherein the screen orientation change event is a hardware change detected via sensors in the device.

11. The non-transitory computer-readable storage medium of claim 8, wherein the screen orientation change event is an input by the user.

12. The non-transitory computer-readable storage medium of claim 8, wherein the screen orientation change event is a signal received from a remote device.

13. The non-transitory computer-readable storage medium of claim 8,
wherein the value of the angle of orientation of the screen is user-defined,
wherein the ScreenOrientation attribute also includes one or more attribute values of a portrait format and/or a landscape format in rendering the rich-media content in the end-user interface.

14. The non-transitory computer-readable storage medium of claim 8, wherein the adjustment of the screen orientation repositions one or more soft keys.

15. An apparatus comprising:
at least one processor; and
at least one memory including computer program code for one or more programs,
the at least one memory and the computer program code configured to, with the at least one processor, cause the apparatus to perform at least the following,
detect a screen orientation change event of a screen,
wherein the screen orientation change event is associated with triggering an angle of orientation of the screen,
wherein the triggered angle of orientation has an angle orientation value other than an angle orientation value of a portrait or landscape orientation;
notify an application framework of the detected screen orientation change event,
retrieve an adjustment of the screen orientation from a rich media engine, one or more applications associated with the application framework, or an operating system associated with the application framework based on the detection of the screen orientation change event, said one or more applications being associated with the rich media engine,
wherein the rich media engine is configured to provide a rendering in a multimedia format of rich-media content in an end-user interface,
wherein the rich media engine includes a screenOrientation attribute,
wherein the screenOrientation attribute includes a screenWidth and/or screenHeight defining one or more screen dimension attributes of the screen,
wherein the screenOrientation attribute includes an attribute value, based on the angle orientation value, specifying the angle of orientation of the screen, other than an angle of portrait or landscape orientation, in rendering the rich-media content in the end-user interface,
determine if the one or more applications or the operating system are configured to accommodate a screen orientation change,
if the application framework is in control of changing the angle of orientation of the screen, then applying the angle of orientation of the screen to the rich media engine,
if the application framework is not in control of changing the angle of orientation of the screen, then notifying the rich media engine of the screen orientation change event,
wherein the screenOrientation attribute specifies a view mode which determines a subset of the rich-media content rendered in the end-user interface,
adapt a layout and/or visual representation of at least part of the rich-media content in the end-user interface based on the adjustment of the screen orientation.

16. The apparatus of claim 15, wherein the rich media engine is further configured to provide navigation through and/or synchronized interaction with the rendering of the rich-media content in the end-user interface,
wherein the rich media content includes at least one of audio content, video content, text, images, XML-based content and combinations thereof,
wherein the multimedia format is a dynamic and interactive multimedia scene (DIMS) format.

17. The apparatus of claim 16, wherein the screen orientation change event is a hardware change detected via sensors in the device.

18. The apparatus of claim 15, wherein the screen orientation change event is an input by the user.

19. The apparatus of claim 15, wherein the screen orientation change event is a signal received from a remote device.

20. The apparatus of claim 15,
wherein the value of the angle of orientation of the screen is user-defined,
wherein the ScreenOrientation attribute also includes one or more attribute values of a portrait format and/or a landscape format in rendering the rich-media content in the end-user interface.

21. The apparatus of claim 15, wherein the adjustment of the screen orientation repositions one or more soft keys.

22. A rich media engine interface embodied on a non-transitory computer-readable storage medium comprising:
a ScreenOrientationEvent attribute adapted to adjust a screen orientation of a screen upon a screen orientation change event,
wherein the screen orientation change event is associated with triggering an angle of orientation of the screen,
wherein the triggered angle of orientation has an angle orientation value other than an angle orientation value of a portrait or landscape orientation;
one or more screen dimension attributes retrieved from one or more applications or an operating system defining dimensions of the screen after changing orientation,
wherein the rich media engine interface is configured to provide a rendering in a multimedia format of rich-media content,
wherein the screenOrientationEvent attribute includes a screenWidth and/or screenHeight defining one or more screen dimension attributes of the screen,
wherein the screenOrientationEvent attribute includes a value of a specification of an angle of orientation format, other than an angle of portrait or landscape orientation, rendering the rich-media content in the screen, if an application framework is in control of changing an angle of orientation of the screen, then applying the angle of orientation of the screen to the rich media engine associated with the rich media engine interface, if the application framework is not in control of changing the angle of orientation of the screen, then notifying the rich media engine of the screen orientation change event, wherein the screenOrientation attribute specifies a view mode which determines a subset of the rich-media content rendered in the end-user interface.

23. The rich media engine interface of claim 22, further comprising:

one or more soft key attributes defining positions of one or more soft keys on the screen, wherein the screenOrientationEvent attribute specifies a view mode which determines a subset of the rich-media content rendered in the end-user interface, wherein the rich media engine interface is further configured to provide navigation through and/or synchronized interaction with the rendering of the rich-media content, wherein the rich media content includes at least one of audio content, video content, text, images, XML-based content and combinations thereof, wherein the multimedia format is a dynamic and interactive multimedia scene (DIMS) format.

* * * * *